(12) United States Patent
Jang et al.

(10) Patent No.: US 8,095,888 B2
(45) Date of Patent: Jan. 10, 2012

(54) MOBILE TERMINAL AND IMAGE CONTROL METHOD THEREOF

(75) Inventors: Se-Yoon Jang, Seoul (KR); Mee-Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 12/402,919

(22) Filed: Mar. 12, 2009

(65) Prior Publication Data

US 2010/0031169 A1 Feb. 4, 2010

(30) Foreign Application Priority Data

Jul. 29, 2008 (KR) ........................ 10-2008-0074278

(51) Int. Cl.
G06F 3/048 (2006.01)
(52) U.S. Cl. ........................................ 715/801; 715/815
(58) Field of Classification Search .................. 715/767, 715/795, 801

See application file for complete search history.

(56) References Cited

U.S. PATENT DOCUMENTS

| 7,721,197 | B2* | 5/2010 | Baudisch et al. | 715/238 |
|---|---|---|---|---|
| 7,814,419 | B2* | 10/2010 | Fabritius | 715/702 |
| 7,900,137 | B2* | 3/2011 | Ivarsoy et al. | 715/238 |
| 2003/0167315 | A1* | 9/2003 | Chowdhry et al. | 709/218 |
| 2005/0040999 | A1* | 2/2005 | Numano | 345/1.1 |
| 2007/0106950 | A1* | 5/2007 | Hutchinson et al. | 715/761 |
| 2007/0136685 | A1* | 6/2007 | Bhatla et al. | 715/800 |
| 2008/0048993 | A1* | 2/2008 | Yano | 345/173 |
| 2008/0094370 | A1* | 4/2008 | Ording et al. | 345/173 |
| 2009/0021790 | A1* | 1/2009 | Krovitz et al. | 358/1.18 |
| 2009/0109243 | A1* | 4/2009 | Kraft et al. | 345/660 |
| 2009/0225026 | A1* | 9/2009 | Sheba | 345/156 |

* cited by examiner

*Primary Examiner* — Omar Abdul-Ali

(74) *Attorney, Agent, or Firm* — Birch, Stewart, Kolasch & Birch, LLP

(57) ABSTRACT

A mobile terminal including a wireless communication unit configured to connect to the Internet to receive a Web page, a display unit configured to display the Web page, and a controller configured to receive an input signal corresponding to a selection of at least one image included in the displayed Web page, to hide or un-hide the selected at least one image, and to reconfigure and display the reconfigured Web page such that an image region where the selected at least one image is located is reduced and other regions of the Web page are increased when the selected at least one image is hid.

14 Claims, 21 Drawing Sheets

FIG. 9B
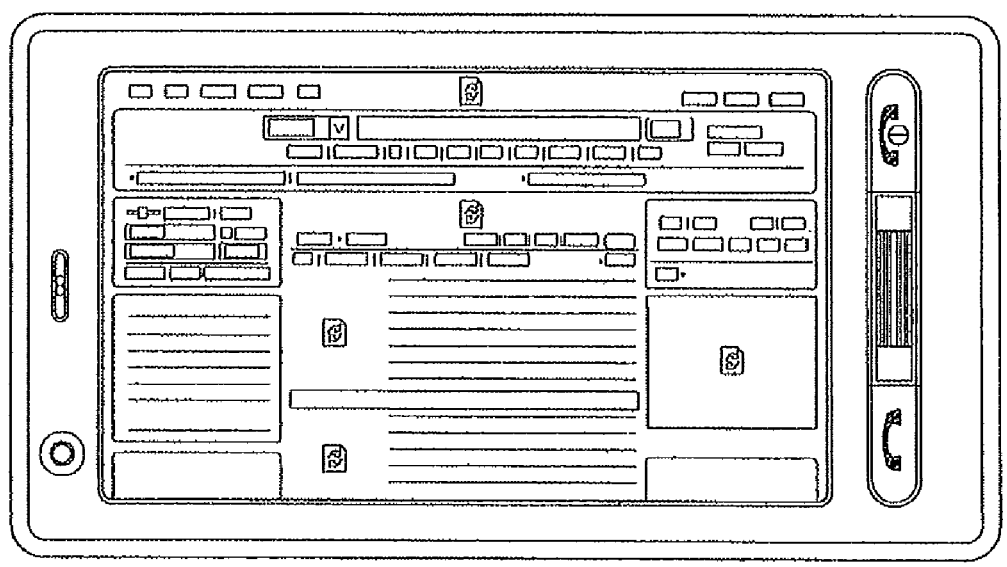
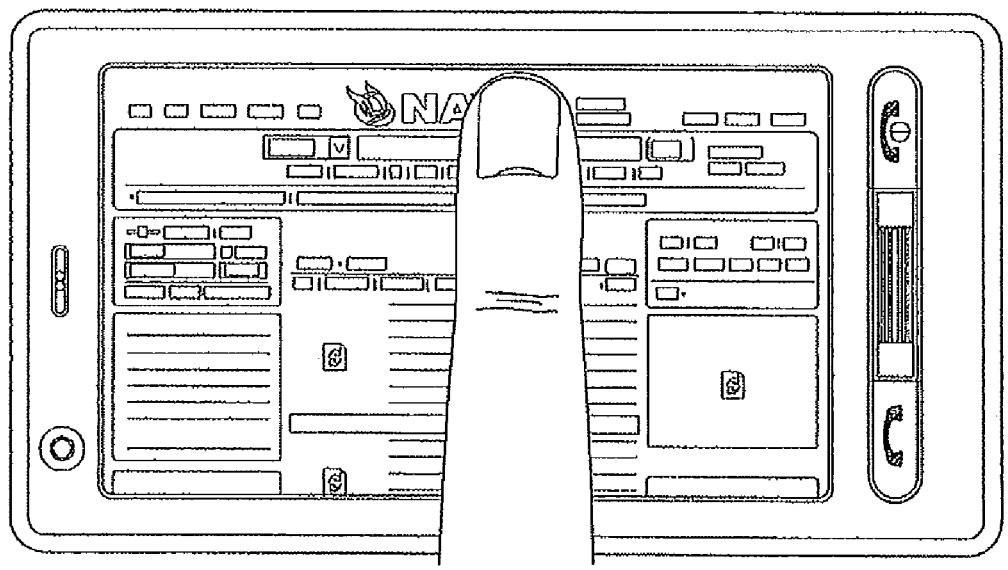

FIG. 11
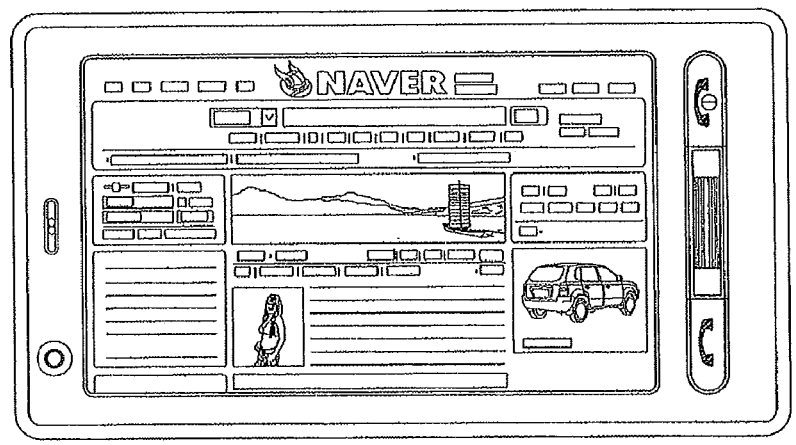
(a)
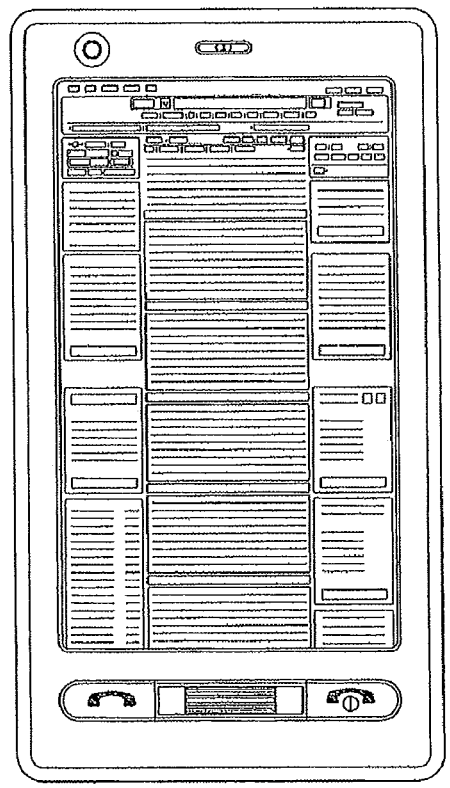
(b)

FIG. 16A
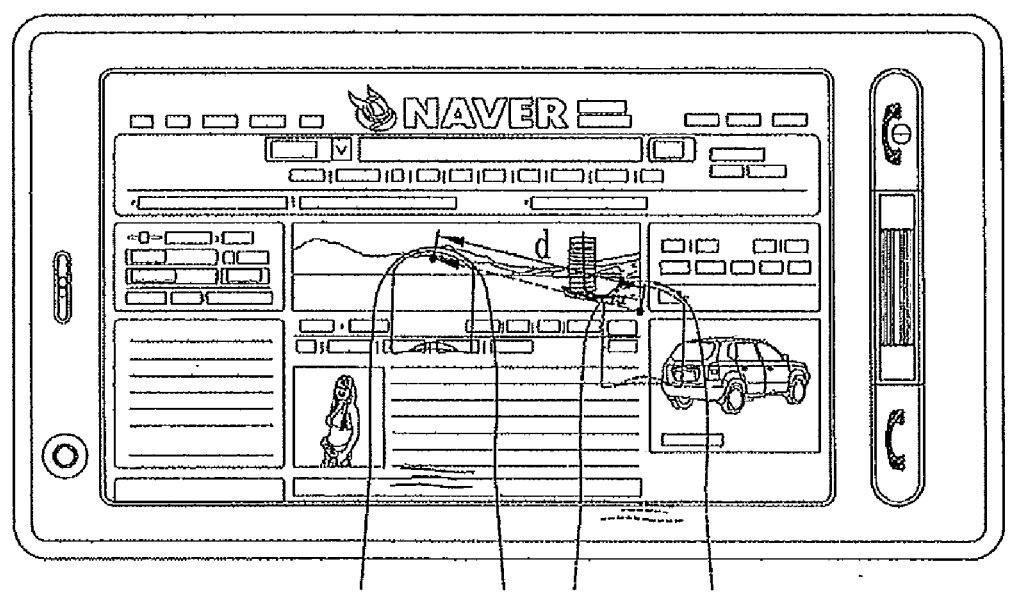
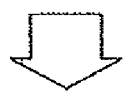
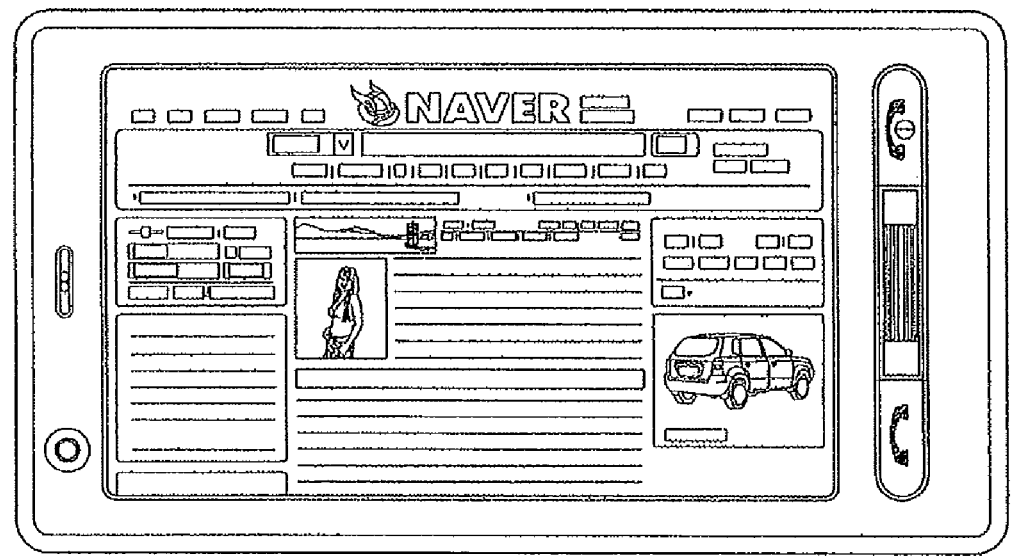

FIG. 16B
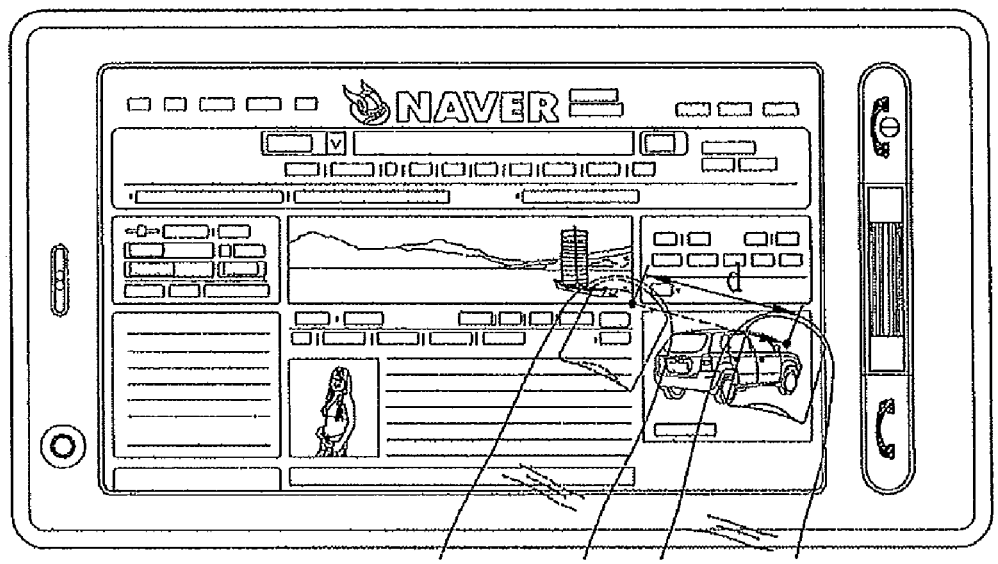
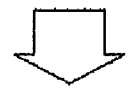
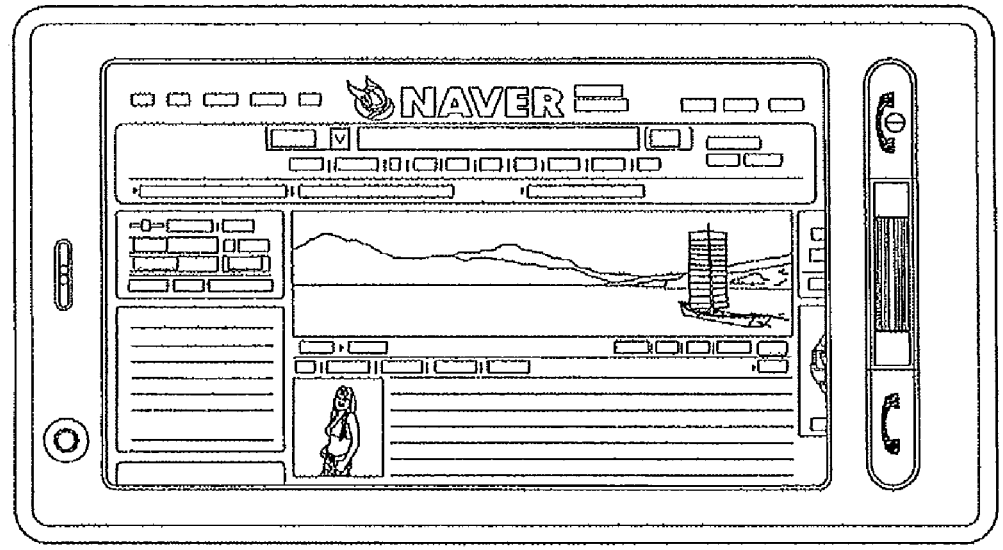

MOBILE TERMINAL AND IMAGE CONTROL METHOD THEREOF

CROSS REFERENCE TO A RELATED APPLICATION

The present application claims priority to Korean Application No. 10-2008-0074278 filed in Korea on Jul. 29, 2008, the entire contents of which is hereby incorporated by reference in its entirety.

BACKGROUND OF THE INVENTION

1. Field of the Invention

The present invention relates to a mobile terminal and corresponding method for selectively controlling an image of a Web page displayed on the mobile terminal.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. Mobile terminal users can also access the Internet to view different information. For example, a user can access a particular webpage to read the news or sporting events, to search for a particular item, to get directions, etc.

However, the mobile terminal is generally small in size, and thus the information displayed on the webpage is sometimes difficult to read, which inconveniences the user.

SUMMARY OF THE INVENTION

Accordingly, one object of the present invention is to address the above-noted and other problems.

Another object of the present invention is to provide a mobile terminal and corresponding method for selectively controlling an image of a Web page.

Still another object of the present invention is to provide a mobile terminal and corresponding method for changing an image display mode of a Web page according to a placed state or orientation of the mobile terminal.

Yet another object of the present invention is to provide a mobile terminal and corresponding method for releasing a concealment setting when a proximity touch is detected over an image set for concealment.

Another object of the present invention is to provide a mobile terminal and corresponding method for providing information about a concealment-set image when a proximity touch is detected over the concealment set image.

Another object of the present invention is to provide a mobile terminal and corresponding method for outputting a vibration according to a type of a concealment-set image when a proximity touch is detected over the concealment-set image.

To achieve these and other advantages and in accordance with the purpose of the present invention, as embodied and broadly described herein, the present invention provides in one aspect a mobile terminal including a wireless communication unit for connecting to the Internet to receive a Web page, a display unit for displaying the Web page, and a controller for setting a display mode of at least one selected from images included in the Web page displayed on the display unit, controlling the corresponding image according to the set display mode information, and reconfiguring the Web page by adjusting a region where text information is displayed. Further, the display mode may include a hide-all-image mode, a hide-image mode, a view-in-sub LCD mode, and a magnification/reduction mode.

To achieve these and other advantages and in accordance with the purpose of the present invention, as embodied and broadly described herein, the present invention provides in another aspect an image control method of a mobile terminal including displaying a Web page received on the Internet, selecting at least one of images of the displayed Web page, setting a display mode of the selected image, and controlling the selected image according to the set display mode and reconfiguring the Web page by adjusting a region where text information is displayed.

In another aspect, the present invention provides a mobile terminal including a wireless communication unit configured to connect to the Internet to receive a Web page, a display unit configured to display the Web page, and a controller configured to receive an input signal corresponding to a selection of at least one image included in the displayed Web page, to hide or un-hide the selected at least one image, and to reconfigure and display the reconfigured Web page such that an image region where the selected at least one image is located is reduced and other regions of the Web page are increased when the selected at least one image is hid.

In still another aspect, the present invention provides a method of controlling a mobile terminal, and which includes connecting to the Internet and receiving a Web page, displaying the Web page, receiving an input signal corresponding to a selection of at least one image included in the displayed Web page, hiding or un-hiding the selected at least one image, and reconfiguring and displaying the reconfigured Web page such that an image region where the selected at least one image is located is reduced and other regions of the Web page are increased when the selected at least one image is hid.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 9A and 9B are overviews of display screens illustrating a method for forcibly releasing a hide setting mode in the mobile terminal according to an embodiment of the present invention;

FIG. 11 is an overview of display screens illustrating a method of changing of an image display mode according to a placed state or orientation of the mobile terminal according to the embodiment of FIG. 10;

FIGS. 16A and 16B are overviews of display screens illustrating a method of controlling of an image in the mobile terminal according to the embodiment of FIG. 15.

DETAILED DESCRIPTION OF THE INVENTION

Reference will now be made in detail to the preferred embodiments of the present invention, examples of which are illustrated in the accompanying drawings.

Figure 1:
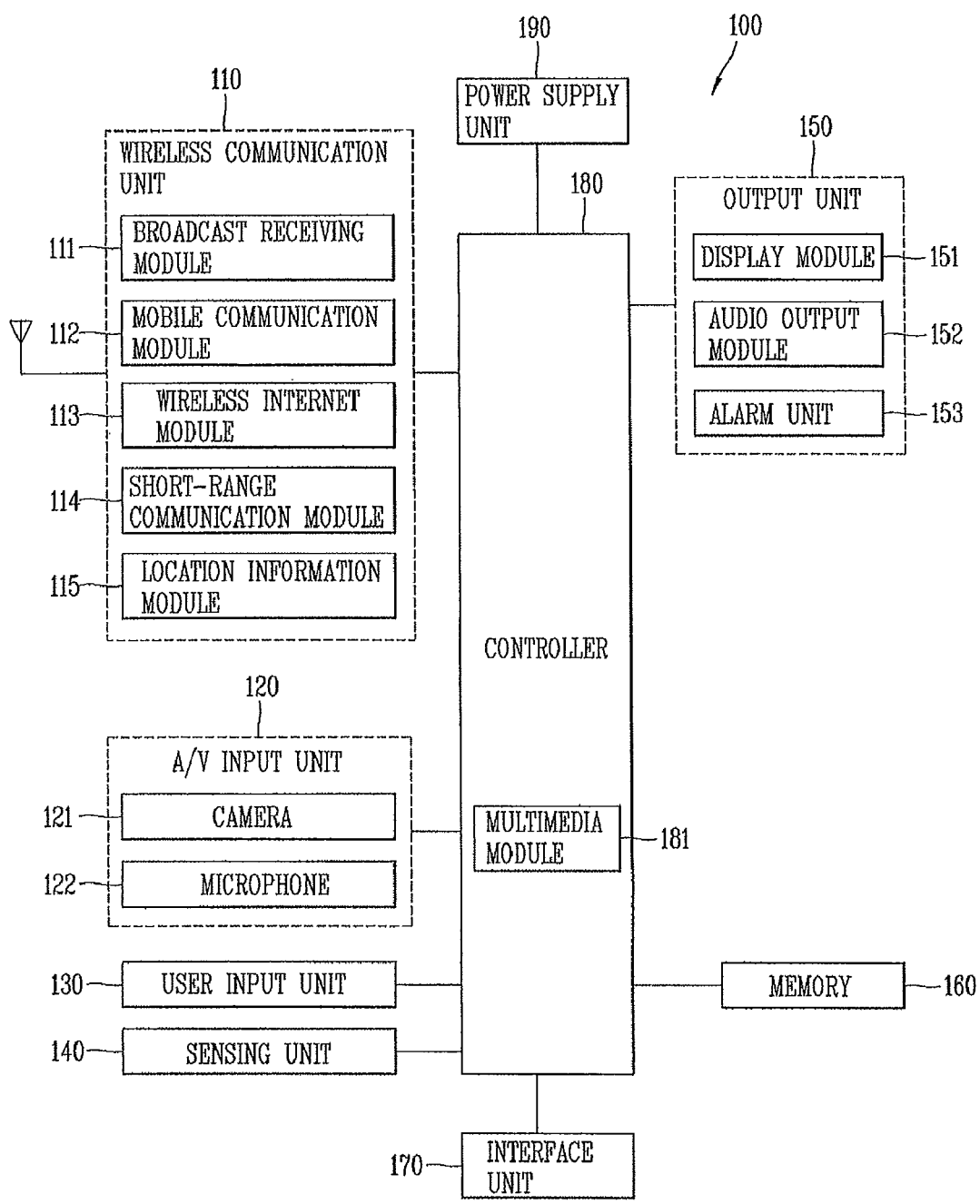
FIG. 1 is a schematic block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and electronic service guide (ESG) of the digital video broadcast-handheld (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others. Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display module 151 (hereinafter referred to as the display 151) that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 1, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Figure 2:
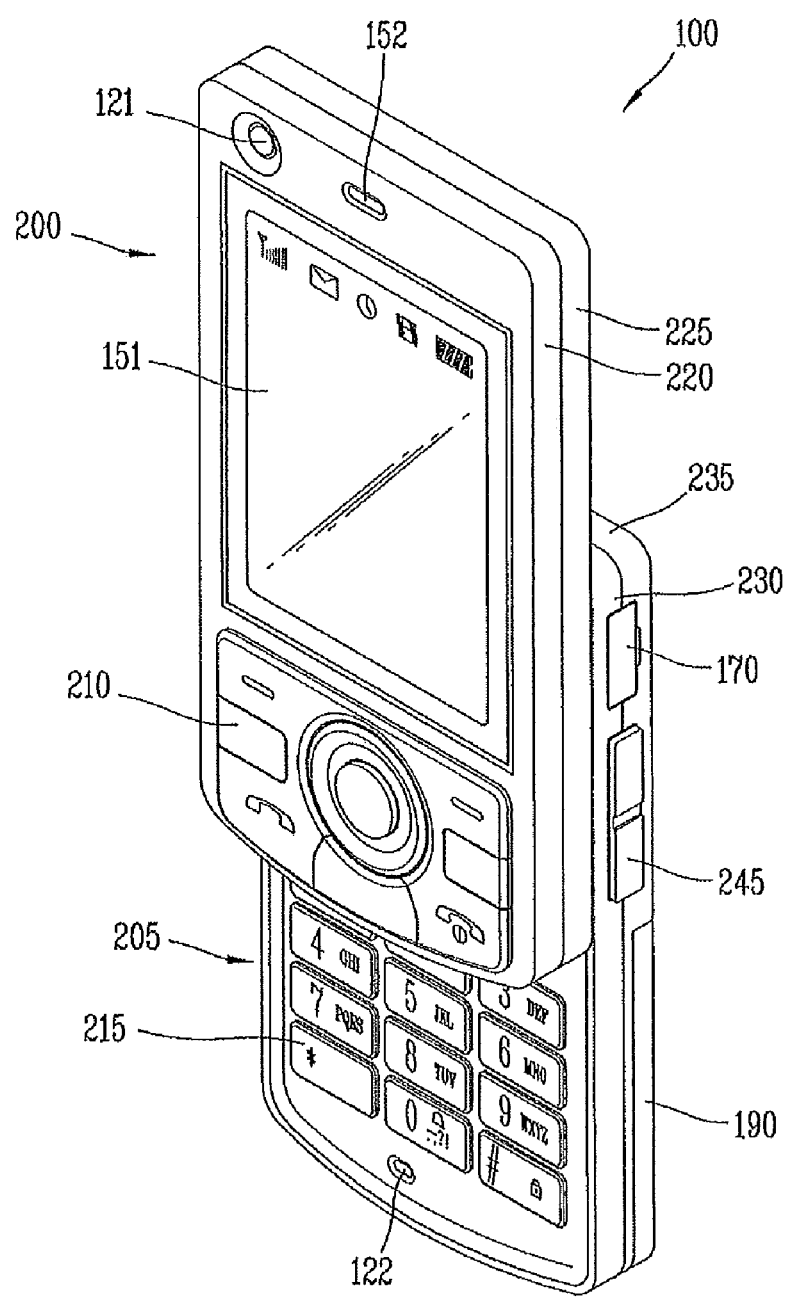
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100. In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti). If desired, one or more intermediate cases may be provided between the first and second cases of one or both of the first and second bodies 200 and 205. In addition, the first and second bodies 200 and 205 are generally sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200. Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
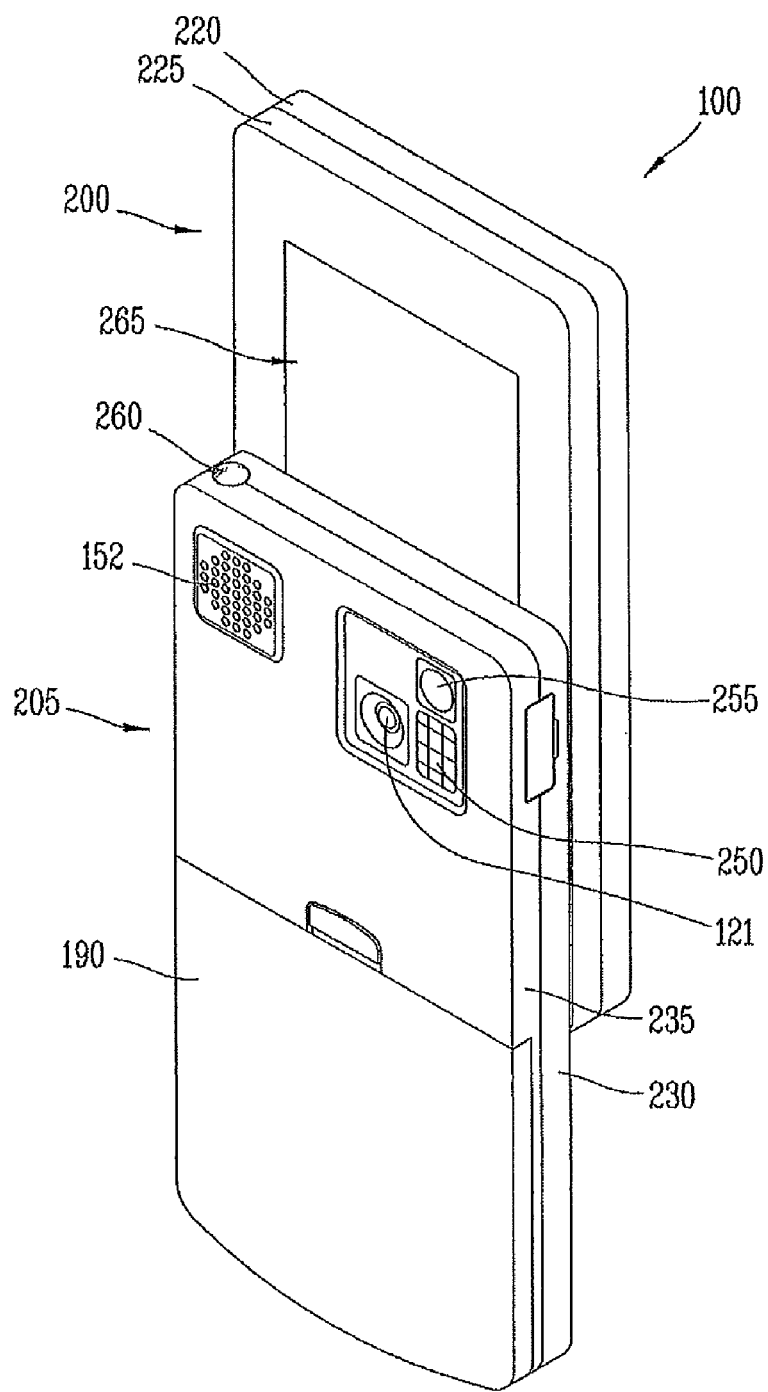
FIG. 3 is a rear perspective view of a mobile terminal according to an embodiment of the present invention.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). The antenna 260 may also be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. For example, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
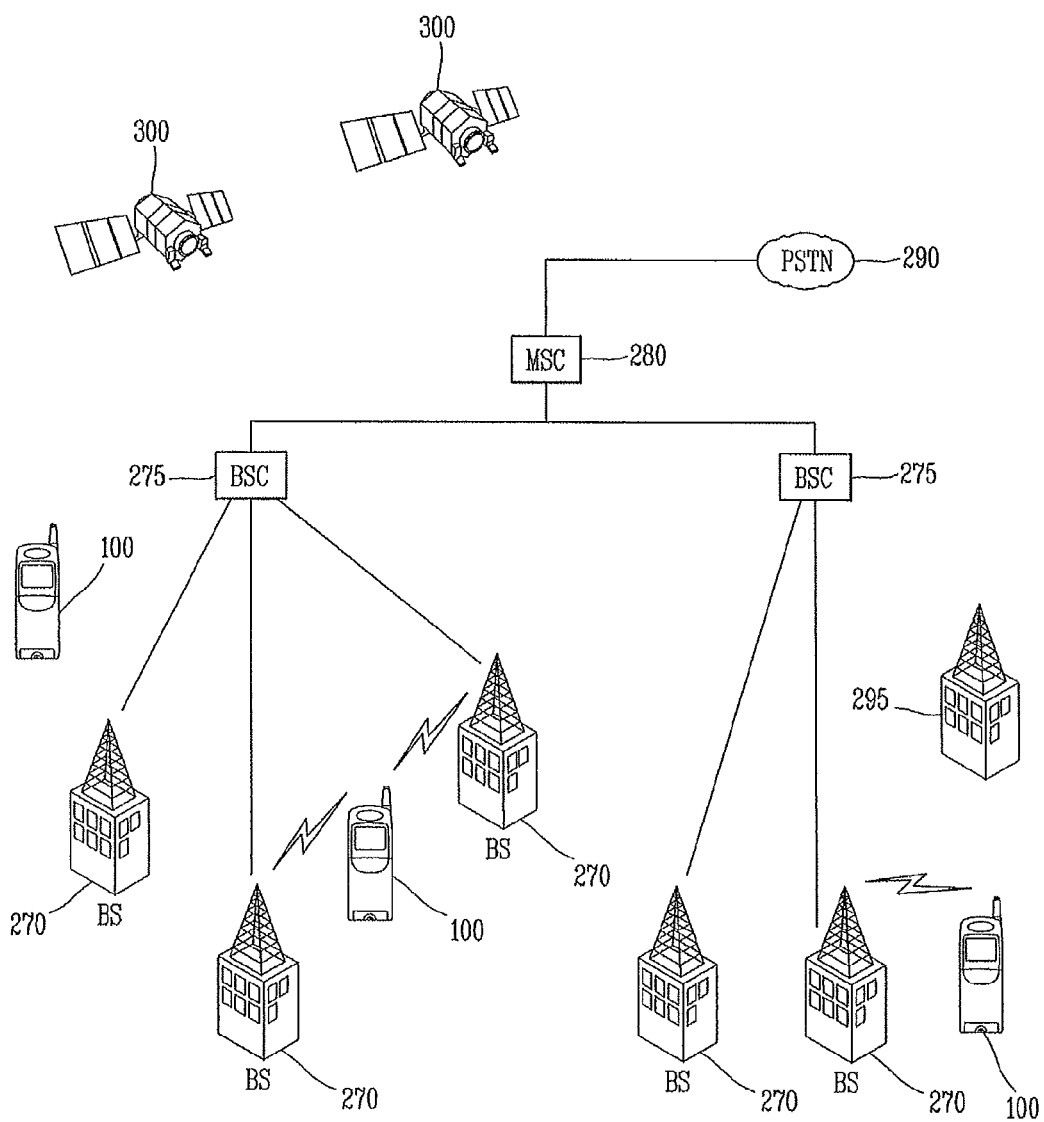
FIG. 4 is a block diagram of a wireless communication system with which the mobile terminal according to an embodiment of the present invention is operable.

Next, FIG. 4 illustrates a CDMA wireless communication system having a plurality of mobile terminals 100, a plurality of base stations 270, a plurality of base station controllers (BSCs) 275, and a mobile switching center (MSC) 280. The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above. FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during operation of the wireless communication system, the base stations 270 receive sets of reverse-link signals from various mobile terminals 100. The mobile terminals 100 also engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

A method for selectively controlling an image of a Web page in the mobile terminal according to an embodiment of the present invention will now be described in detail.

The mobile terminal 100 according to an embodiment of the present invention may be connected to the Internet via the wireless Internet module 113, and display Web information (e.g., a Web page) received via the wireless Internet module 113 on the display unit 151. Further, the mobile terminal 100 may search for the Web information (hypertext, Web page) on the Internet by using a mobile browser. That is, the mobile browser is a Web browser for mobile terminals (portable devices) such as personal digital assistants (PDAs) and mobile phones, and that allows the mobile terminal to display Web contents. For example, the mobile browser may include a wireless application protocol (WAP) browser, an i-mode browser, a Blackberry browser, or the like.

In addition, the controller 180 may selectively set a display mode of an image or images included on the Web page. In more detail, a user can select a particular image on the Web page, and the controller 180 sets a concealment/display feature with respect to the selected image. Further, the image may include a photo image, a picture, a flash, video, or the like. In addition, the image display mode may include a hide-all-image mode, a hide-image mode, a view-in-sub LCD mode, a magnification/reduction mode, storing the image or the like.

The controller 180 can also re-configure a document object model (DOM) within the mobile browser according to selection of the image display mode, and remove undesired information through a rendering process to reconfigure the Web page according to the user request. Also, when a Web page (e.g., HTML document) is downloaded, the browser may internally configure a DOM tree according to DOM standards. For example, FIG. 5 is an overview showing one example of configuration of a DOM tree in the mobile terminal according to an embodiment of the present invention.

Figure 5:
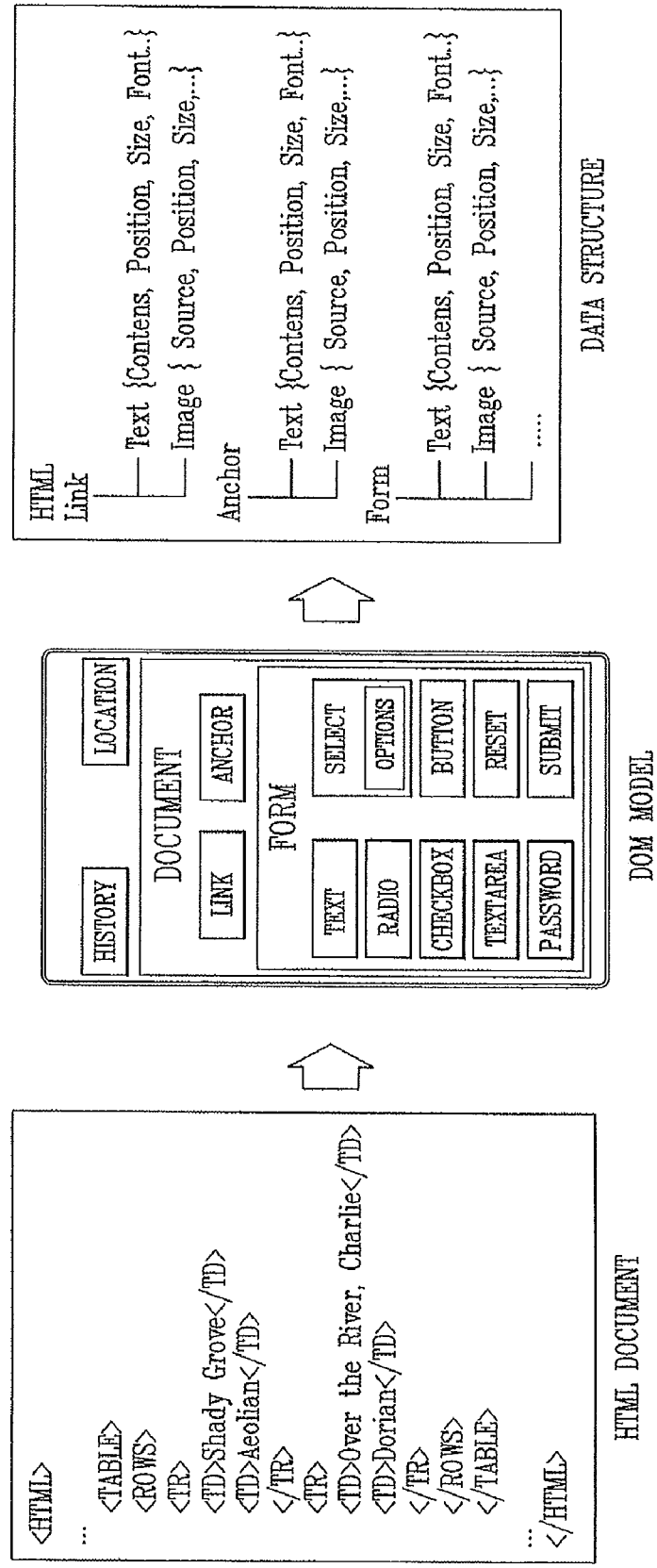
FIG. 5 is an overview showing an example of configuration of a DOM tree in the mobile terminal according to an embodiment of the present invention.

In addition, as shown in FIG. 5, according to the DOM standards, the DOM refers to attribute information included in a corresponding data structure such as an actual position and size information of each object constituting the Web page, and configures the structure in a tree form. Thus, the browser stores attribute information such as size and position information of each object, an image display mode, or the like, for performing the rendering process. When the Web page is re-accessed, the browser may maintain a previously set image display mode using the attribute information.

In addition, when a 'hiding' mode is set for a particular image of the Web page, the controller 180 changes attribute information (e.g., a source, a size, position information, etc.) of the corresponding image in the DOM tree, and performs DOM re-configuration and re-rendering based on the changed attribute information. When the size of the particular image on the Web page is changed, the controller 180 changes the size of the corresponding image in the DOM tree and performs DOM reconfiguration and re-rendering based on the changed size of the image.

Also, when a region for displaying image information is reduced due to a change in the display mode with respect to one or more images of the Web page, the controller 180 performs a Web page reconfiguration and re-rendering by changing the reduced image display region into a region for displaying text information. Accordingly, the controller 180 can adjust the amount of information displayed on the display screen by changing the image display mode. In addition, the controller 180 detects a placed state or orientation (portrait & landscape) of the terminal 100 via the sensing unit 140, and can change a display mode of the image according to the detected placed state of the terminal 100. Further, the sensing unit 140 may include an acceleration sensor, a tilt sensor, or the like, to detect a rotation, tilting, or the like, of the terminal.

Further, the controller 180 can detect a proximity touch or a touch via the sensing unit 140, and temporarily release the set hiding mode of the image corresponding to the point where the proximity touch has been detected. Also, when a touch to the image is detected, the controller 180 can move to a Web page linked to the corresponding image. Also, the sensing unit 140 may include a proximity sensor that detects an approach of a pointing object used to designate a location such as the user's finger, stylus, light pen, or the like, and a touch sensor that detects a contact of the pointing object.

Further, the proximity sensor may detect the distance between the pointing object and the sensor based on a capacitance changing according to the approach distance of the pointing object and output the corresponding value or may output location information of the point approached by the pointing object. In this embodiment, the capacitance proximity sensor is taken as an example, but various other types of proximity sensors may be used.

In addition, the touch sensor outputs location information of the corresponding point from which a touch of the pointing unit is detected, as a coordinate value. The touch sensor may be implemented as various types of touch pads such as a resistive touch pad, a capacitive touch pad, or the like. Further, the touch pad may be implemented as a touch screen form by having an inter-layered structure with the display unit 151. Thus, the display unit 151 may be also used as an input device as well as a display device.

Thus, the mobile terminal 100 according to an embodiment of the present invention access the Internet via the mobile browser to search and download a particular Web page. Namely, the controller 180 of the mobile terminal 100 accesses the Internet via the wireless Internet module 113 and downloads a desired Web page. Here, the Web page refers to an HTML (Hyper Text Markup Language) and an XML (Extensible Markup Language)-based Web document.

Upon downloading the Web page, the controller 180 configures a DOM tree with respect to objects constituting the Web page. Here, the controller 180 configures the DOM only with a data structure excluding attribute information such as an actual position, size, or the like, with respect to each object.

Figure 6:
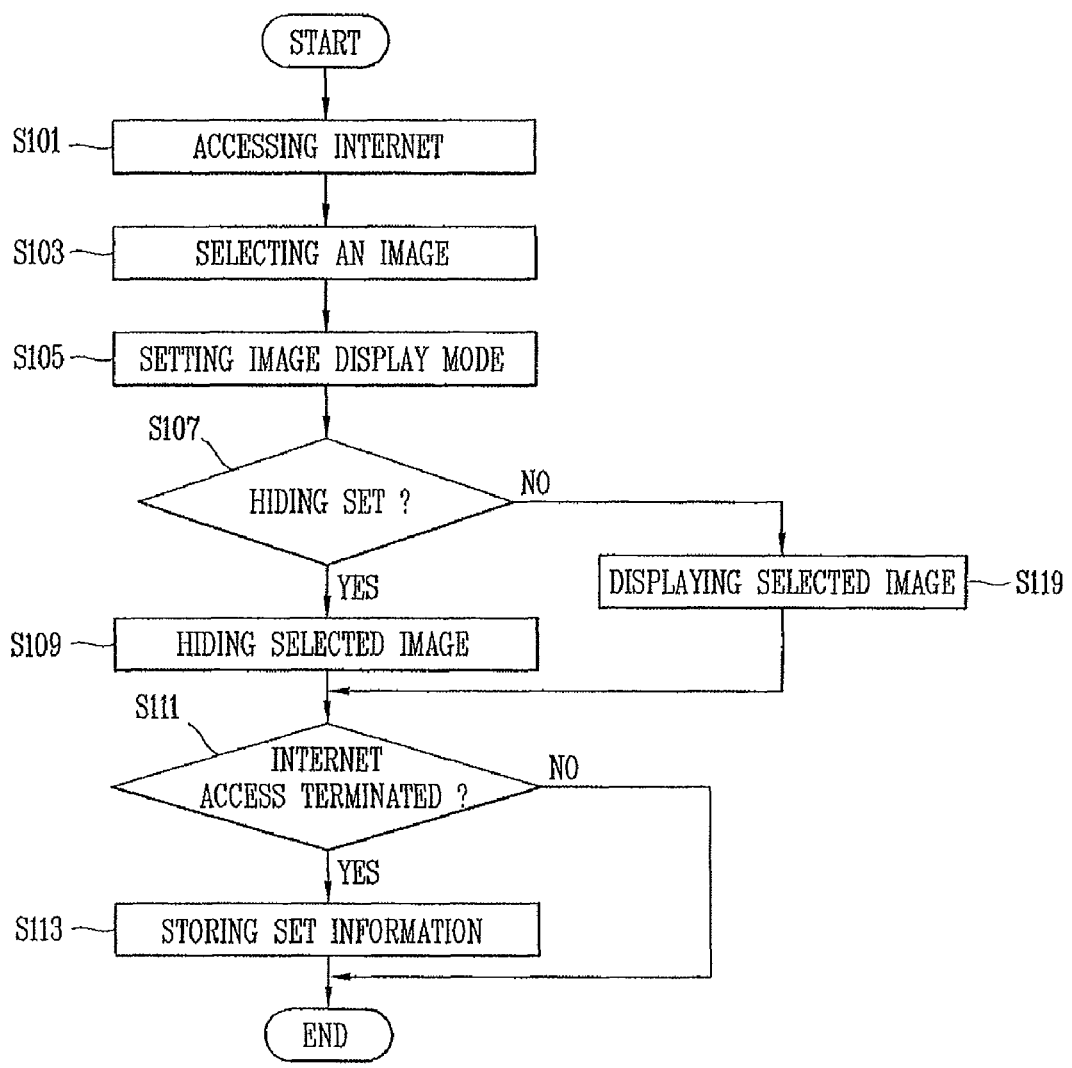
FIG. 6 is a flow chart illustrating an image control method of the mobile terminal according to an embodiment of the present invention.

Next, FIG. 6 is a flow chart illustrating an image control method of the mobile terminal according to an embodiment of the present invention. As shown in FIG. 6, the controller 180 accesses the Internet via the wireless Internet module 113, searches a pre-set Web page (homepage), receives the corresponding Web page, and displays the Web page (S101). Further, the controller 180 searches the desired Web information via the mobile browser, optimizes the searched Web page according to the environment of the display unit 151 of the mobile terminal 100, and displays the Web page on the display unit 151.

In addition, while the Web page is being displayed on the display unit 151, the user can select one or more of the images included in the Web page, and the sensing unit 140 transmits a sensing signal according to the image selection to the controller 180 (S103). Upon receiving the sensing signal, the controller 180 displays a menu for adjusting the display mode of the selected image (hereinafter referred to as an image display mode). In addition, the method for executing the menu for setting the image display mode (setting menu) differs based on a keypad, a touch screen and a proximity touch.

For example, if the method is based on use of the keypad, and when the user selects an OK button after moving a focus to a desired image according to manipulation of a direction key, the controller 180 executes the display mode setting menu. Alternatively, if the method is based on the touch screen, and when the user touches particular image among the images of the Web page for a particular length of time (a long touch), the controller 180 executes the display mode setting menu. If the method is based on the proximity touch, and when the user's finger approaches an image for which the image display mode is desired to be adjusted, the controller 180 detects the approaching finger via the sensing unit 140 and executes the display mode setting menu.

Accordingly, when the user selects the image display mode via the setting menu displayed on the display unit 151, the controller 180 sets the image display mode according to the user input (S105). For example, if the user selects the option 'select image hiding' via the display mode setting menu, the controller 180 sets the display mode of the selected image as the 'hiding' mode. Also, if the display mode of the particular image is changed, the controller 180 reconfigures the DOM by changing the source, size, the position information, or the like, of the corresponding image in the DOM tree.

Subsequently, when the image display mode is set as the 'hiding' mode (Yes in S107), the controller 180 does not display the selected image (S109). That is, the controller 180 performs rendering based on the re-configured DOM. At this time, the controller 180 may substantively display a position indicator (an icon, symbol, or the like) indicating the position where the image has been positioned, or may display the corresponding region as a blank. In addition, the controller 180 adjusts the image display region according to the size of the position indicator. Namely, if the size of the position indicator is smaller than the selected image, the controller 180 may reduce the image display region according to the size of the position indicator, and may magnify the region for displaying text information as much as the image display region has been reduced. Accordingly, the portion which has been hidden due to the limited size of the screen can be displayed on the screen, so more information can be displayed on the limited screen of the display.

Meanwhile, if the image display mode has not been set as hiding (namely, the image mode is set as the "viewing" mode) (No in S107), the controller 180 displays the selected image (S119). For example, if select image viewing mode is set for the image for which hiding has been set, the hidden image is displayed. Thereafter, when the Internet connection is terminated (Yes in S111), the controller 180 stores the setting information related to the image display mode in the memory 160 (S113). In addition, the setting information may include a Web page address (URL), image identification information, hiding setting/releasing actions (viewing setting/releasing), or the like. The image identification information may include the image file name, a tag ID (div tag, span tag, etc.), an image size, or the like.

After the Internet connection is stopped, and if a previously accessed Web page is re-accessed, the controller 180 may discriminate a hiding-set image from images of the Web page using the image identification information as an identifier. Namely, when the previously accessed Web page is re-accessed, the controller 180 adjusts the image hiding/viewing of the Web page based on the previously stored setting information in the memory 160.

Therefore, according to an embodiment of the present invention, because the setting information is stored by discriminating each image using the image identification information, and when a previous Web page is returned after moving to a different Web page, the previous setting with respect to the previous Web page can be maintained.

Figure 7A:
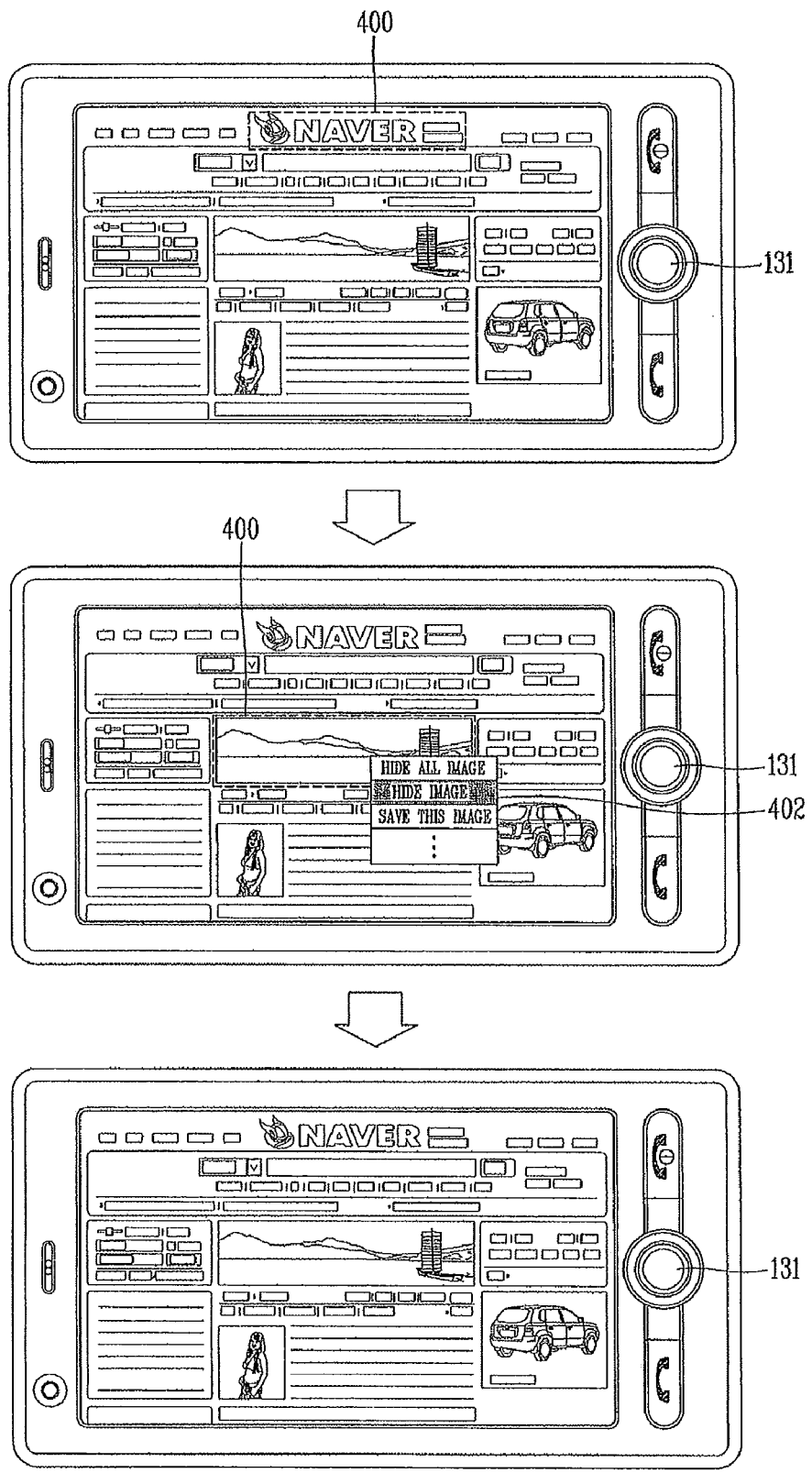
FIGS. 7A to 7C are overviews of display screens of the mobile terminal performing the embodiment shown in FIG. 6.
Figure 7B:
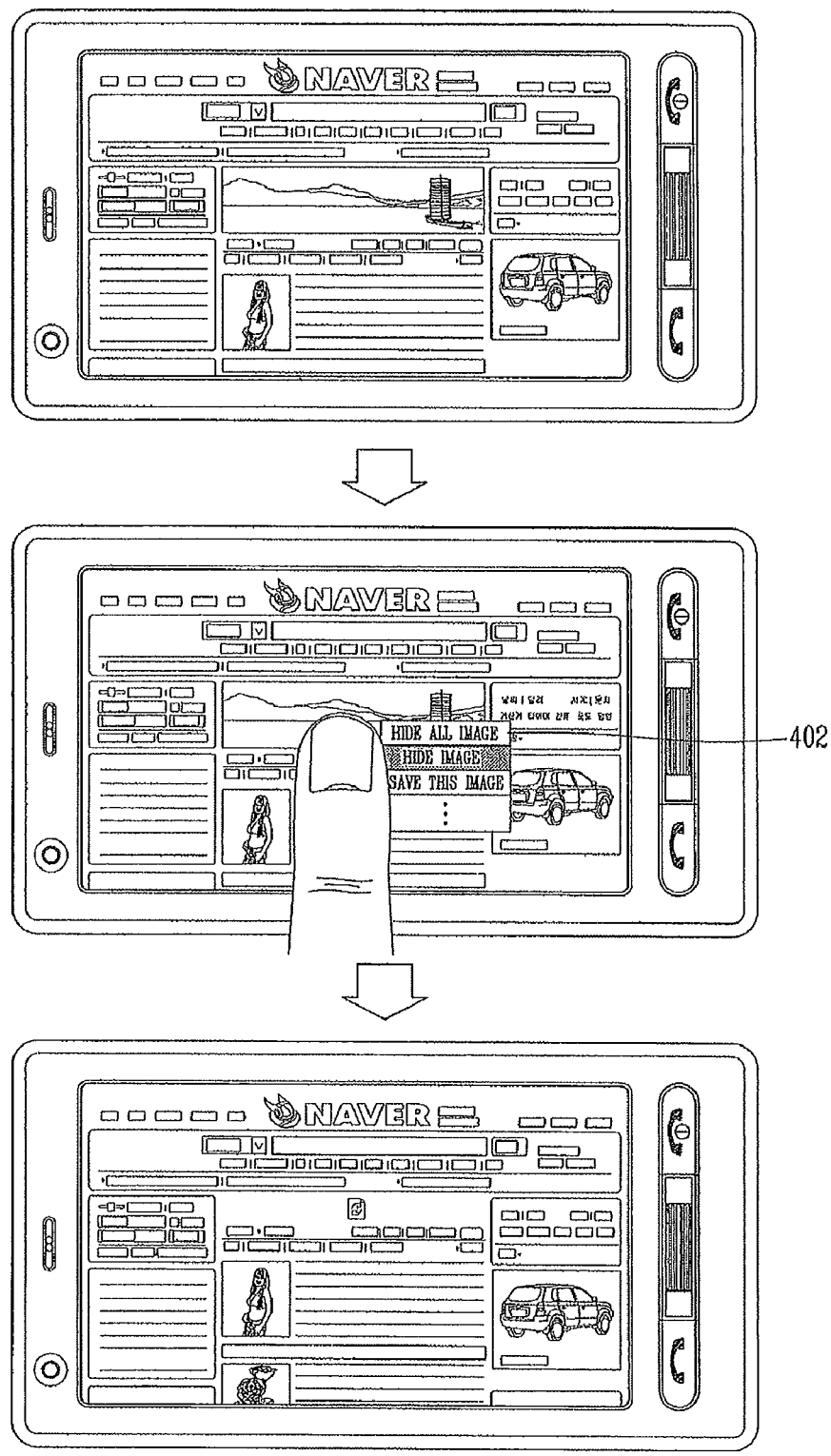
Figure 7C:
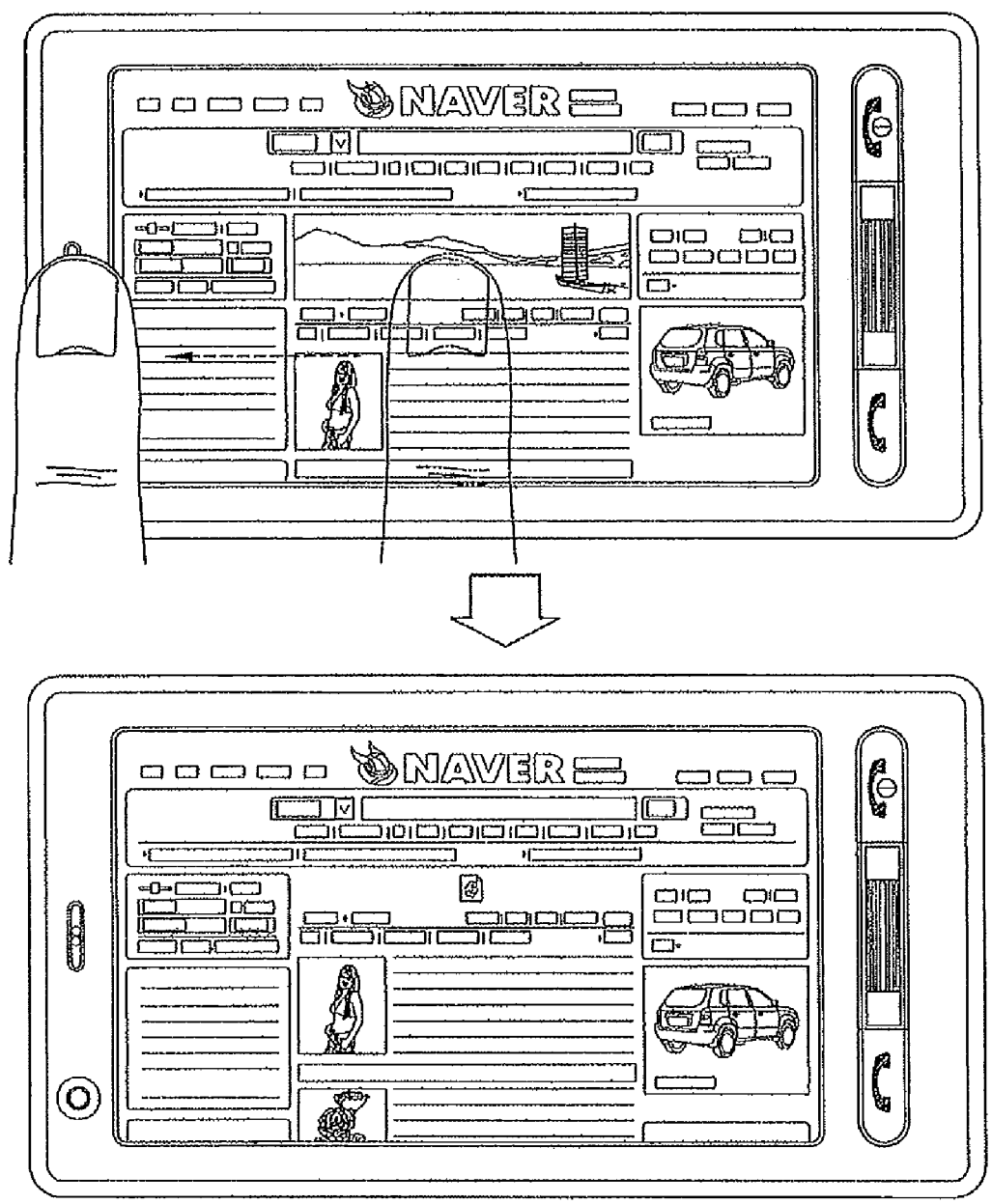

Next, FIGS. 7A to 7C are overviews of display screens of the mobile terminal performing the embodiment as shown in FIG. 6. As shown in FIG. 7A, the controller 180 of the mobile terminal 100 connects to the Internet via the wireless Internet module 113, and displays a Web page received via the wireless Internet module 113 on the display unit 151. Then, the user manipulates a direction key 131 to move the select indicator 400 over an object (image, text, etc.) to be selected. Further, the select indicator 400 may be implemented in the form that the user can recognize the selection of the object such as an underline, a box, a color, magnification, or the like.

The user can then press an OK button after the object has been identified via the select indicator 400, and the controller 180 displays a setting menu 402 for setting an image display mode. As shown in FIG. 7A, the setting menu 402 includes the options to hide all images, to hide the selected image and to save the image (other options are also possible). When the user selects the 'hide image' option, the controller 180 does not display the selected image. Further, as discussed above, the controller 180 may display a position indicator indicating the portion where selected image has been positioned. Further, the position indicator may include an icon, a symbol, or the like. In addition, when the image display region is reduced according to setting of hiding of the image, the controller 180 reconfigures the Web page to magnify a display region to display text as much as the reduced image display region, to thereby display more information on the display of the terminal.

FIG. 7B also illustrates the controller 180 connecting to the Internet via the wireless Internet module 113 and displaying the Web page received via the wireless Internet module 113 on the screen of the display unit 151. However, in FIG. 7B, the user touches a particular object on the Web page rather than using a physical direction key as in FIG. 7A. In more detail, as shown in FIG. 7B, the sensing unit 140 detects the user touching a particular object on the Web page being displayed on the display unit 151, and generates a corresponding sensing signal. The controller 180 thus detects that the touch input has been generated via the sensing signal received from the sensing unit 140. Also, when the user maintains the touch input for a certain time, the controller 180 displays the menu 402 for setting the image display mode.

Then, with the setting menu 402 displayed, the user can touch one of the displayed options (e.g., hide all images, hide the selected image, save the selected image, etc.). The controller 180 then determines which option the user has selected, and if the 'hide image' option is selected, the controller 180 does not display the selected image. Further, if the user releases the touch input after the initial touch position to activate the menu 402, the controller 180 does not perform any operation. In addition, as discussed above with respect to FIG. 6, the controller 180 stores the set information in the memory 160 when the Internet connection is terminated.

As shown in FIG. 7C, when the user touches one of the images of the displayed Web page and performs a dragging operation to move the image out of the boundary of the screen of the display unit 151, the controller 180 sets a display mode of the corresponding image as the 'hiding' mode. Thus, the controller 180 does not display the corresponding image on the Web page on the display unit 151. Further, as discussed above, the controller 180 substitutes the selected image with a position indicator, and reduces an image display region according to the size of the position indicator. The controller 180 also refreshes the Web page on the display unit 151. Accordingly, the mobile terminal 100 can display more information which has not been previously displayed as large as the image display region was reduced.

In addition, the controller 180 can also stored the selected image so that the user can later view the stored image. For example, if the Web page includes an image of a celebrity, for example, that the user enjoys, the user can select the image of the celebrity and perform a menu operation, touch and drag operation, etc. to save the image to their favorites photo album, for example. Thus, in the embodiment shown in FIG. 7C, for example, the controller 180 can remove the image from the Web page, refresh the Web page without displaying the selected image, and store the selected image automatically based on the touch and drag operation performed by the user.

Figure 8:
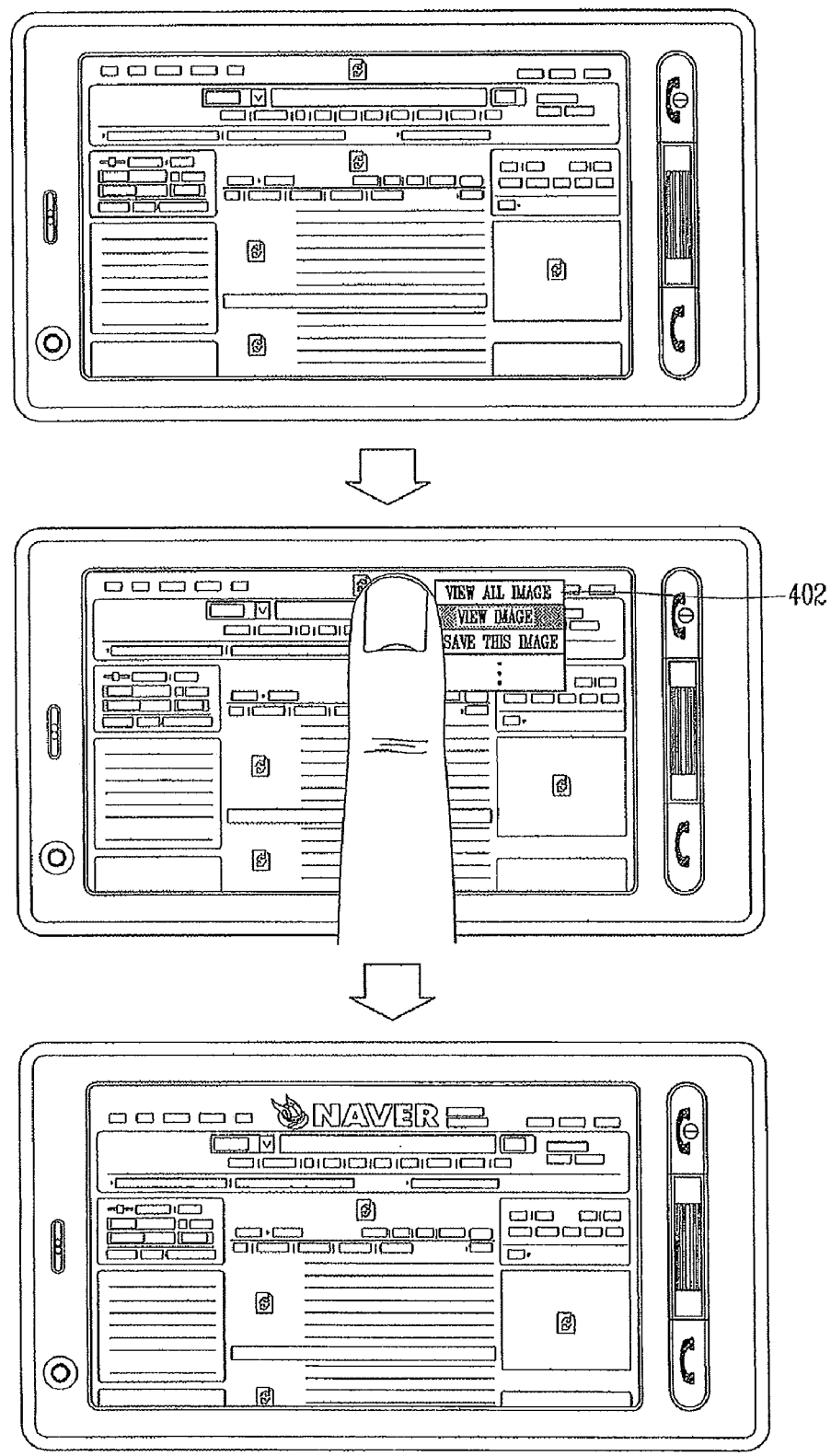
FIG. 8 is an overview of display screens illustrating the process of releasing an image hiding mode in the mobile terminal according to another embodiment of the present invention.

Next, FIG. 8 is an overview of display screens illustrating the process of releasing an image hiding mode in the mobile terminal according to an embodiment of the present invention. As shown in FIG. 8, the controller 180 hides a particular image selected by the user and displays a position indicator in place of the selected image such that the additional information in the Web page can be increased in size. Then, if the user wants to redisplay the particular image (i.e., un-hide the image), the user can touch the particular image for a predetermined amount of time, for example. That is, the user can perform a long touch operation.

When the user performs the long touch operation, the controller 180 displays the menu 402 for setting an image display mode. The menu 402 in FIG. 8 is slightly different than the menu 402 in FIG. 7, because the menu 402 in FIG. 8 is directed to redisplaying or "un-hiding" images. As shown in FIG. 8, when the user selects the 'view image' option, the controller 180 releases the 'hiding' mode and displays the image on the display unit 151. The controller 180 then refreshes the corresponding Web page.

In addition, in the embodiment in FIG. 8, the user has released the setting of one particular image by touching the particular image. However, the controller 180 can also set or release the hiding function with respect to all images of the Web page. For example, the user can select the 'view all image' options in the menu 402 to have the controller redisplay all of the hidden images. A similar concept applies to the user hiding all images by selecting the 'hide all images' option of the menu 402 shown in FIG. 7.

Figure 9A:
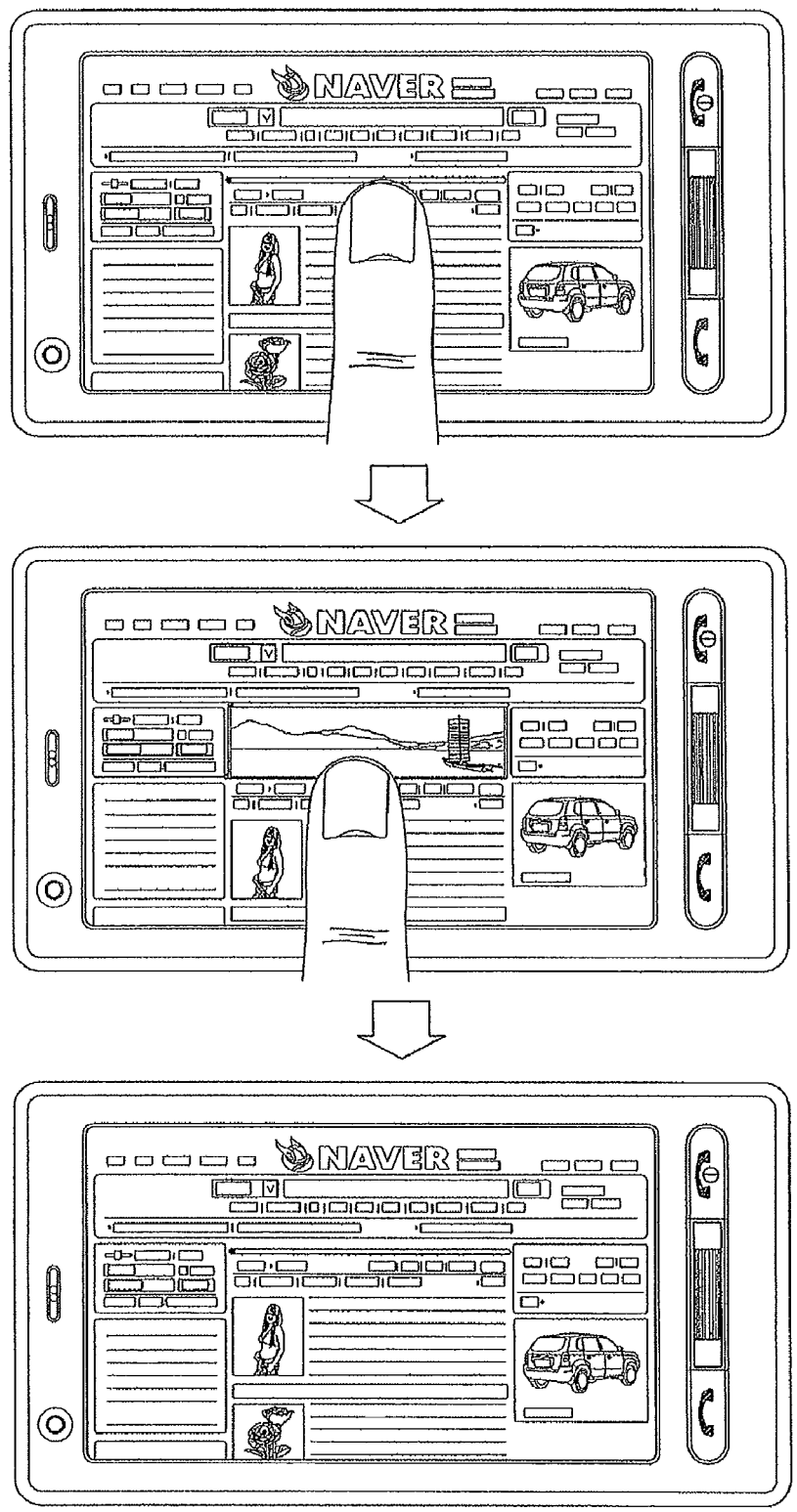

Next, FIGS. 9A and 9B are overviews of display screens illustrating a method for forcibly releasing a hide setting mode in the mobile terminal according to an embodiment of the present invention. As shown in FIG. 9A, when the user has set the image display mode with respect to a particular image of a Web page as the hiding mode in the mobile terminal 100, the controller 180 hides the particular image (or images). In the embodiment shown in FIG. 9A, the controller 180 uses a roll-up effect to hide the image. In more detail, the roll-up effect is similar to when a blind or shade over a window is rolled-up. Thus, in this example, when the user selects a particular image to be hidden, the controller 180 rolls up the selected image and display a substitute icon corresponding to a rolled blind or shade, for example.

Then, as shown in FIG. 9A, to redisplay the hidden image, the user can touch a lower end of the substituted image and drag or unroll the particular image. The user can also use a proximity touch method, physical key method, etc. to unravel or unroll the particular image or images. In addition, in one example, the controller 180 displays the unraveled or unrolled image as long as the user maintains touch on the screen, for example, and when the user releases their finger, the controller 180 rolls back the particular image. In an alternative example, the controller 180 can maintain the image in the unrolled state when the user releases their finger. The different options can also be preset on the terminal (e.g., whether to maintain the image or roll back the image upon release of the touch input operation). The user can also hide or roll up an image by touching and dragging the image in the upwards direction, for example.

FIG. 9B illustrates the case where the user is using the proximity touching operation to release a particular setting mode for an image or images. In more detail, the user places their finger above a particular image and moves their finger in a direction to unravel the image. That is, the sensing unit 140 detects the proximity touch, and informs the controller 180. The controller 180 then checks a display mode of the image corresponding to the position where the proximity touch has been detected. If the hiding mode has been set for the corresponding image, the controller 10 forcibly releases the set hiding while the proximity touch is maintained. Also, while the proximity touch is maintained, the controller 180 displays the corresponding image. In addition, FIGS. 9A and 9B illustrate the hiding option set for the selected image being forcibly released (temporarily released). However, the present invention may be implemented such that when an image searching is performed on the Web page, the image display hiding mode set can be forcibly released.

Figure 10:
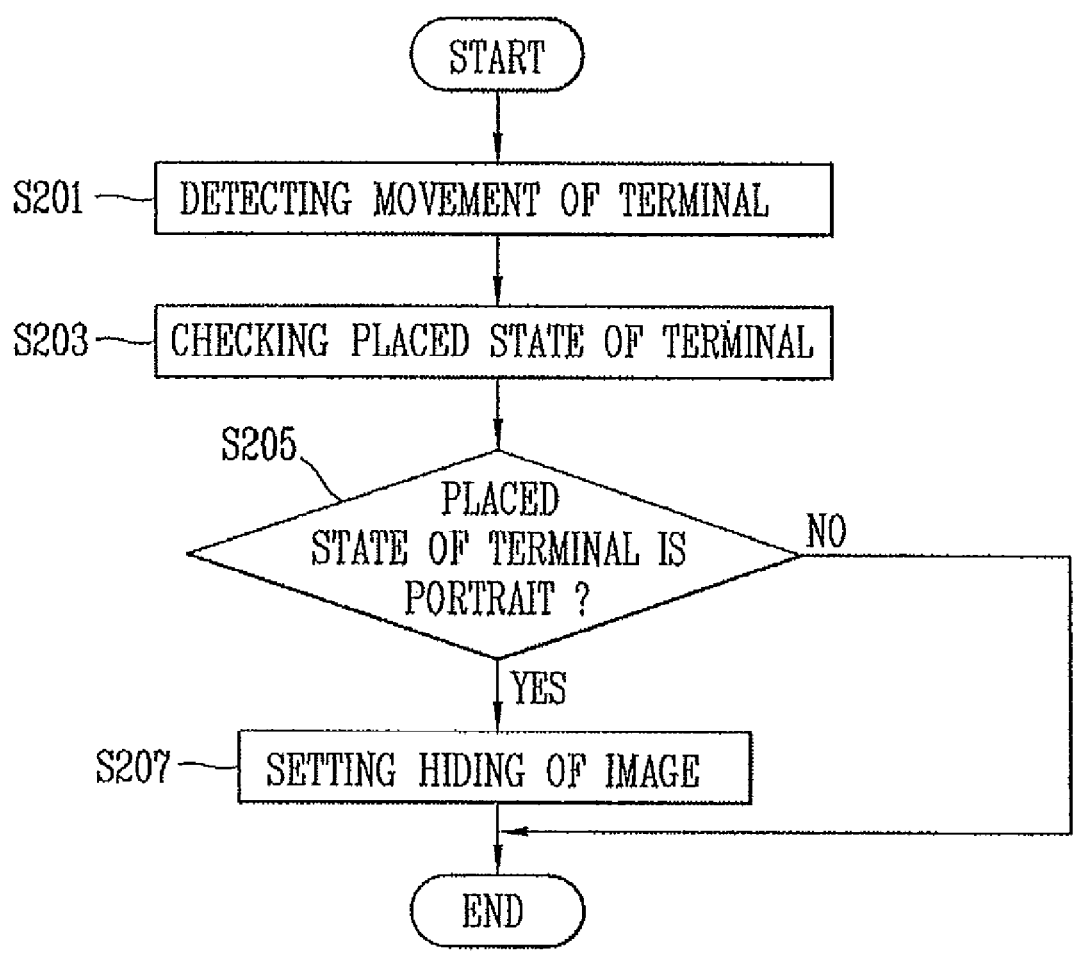
FIG. 10 is a flow chart illustrating an image control method according to a placed state or orientation of the mobile terminal according to another embodiment of the present invention.

Next, FIG. 10 is a flow chart illustrating an image control method according to a placed state or orientation of the mobile terminal according to another embodiment of the present invention. In this embodiment, the image display mode of a Web page is changed according to a placed state or orientation of the terminal.

As shown in FIG. 10, the controller 180 detects a movement of the terminal 100 via the sensing unit 140 (S201). In addition, as discussed above, the sensing unit 140 may include an acceleration sensor, a tilt sensor, or the like. The controller 180 also checks a placed state or orientation (e.g., landscape or portrait orientation) of the terminal 100 according to a sensing signal generated from the sensing unit 140 (S203). If the placed state of the terminal is the portrait orientation (Yes in S205), the controller 180 sets the image display mode of the Web page as the hiding mode, and configures and displays a text-based Web page without displaying an image or images included in the Web page (S207). If the placed state of the terminal is the landscape orientation (No in S205), the controller 180 sets the image display mode as the image display mode and displays an image or images included in the Web page.

In addition, if the Web page includes a plurality of images, the controller 180 can hide all images when the terminal is in the portrait orientation, one large image, or a predetermined number of images. The controller 180 can also hide one image each time the user switches the terminal from the landscape mode to the portrait mode. Thus, the user could rotate the terminal once to hide one image, twice in a successive manner to hide two images, etc.

Next, FIG. 11 is an overview of display screens illustrating a method changing an image display mode according to a placed state or orientation of the mobile terminal according to the embodiment of FIG. 10. As shown in FIG. 11(*a*), if the placed state or orientation of the mobile terminal 100 is in the landscape orientation, the controller 180 sets an image display mode of a Web page received via the wireless Internet module 113 as the 'displaying (releasing hiding) mode' and displays an image included in the Web page. Further, in on example, if the user has previously selected an image to be hid, the controller 180 can continue to hide this image even in the landscape orientation.

As shown in FIG. 11(*b*), when the placed state of the terminal is changed to the portrait orientation, the sensing unit 140 detects this orientation and informs the controller 180. Thus, the controller 180 checks the detected placed state of the terminal and sets the image display mode of the Web page as the hiding mode. Namely, as shown in FIG. 11(*b*), the controller 180 hides the image or images of the Web page, reconfigures a text-based Web page, and displays the reconfigured Web page on the display unit 151.

Figure 12:
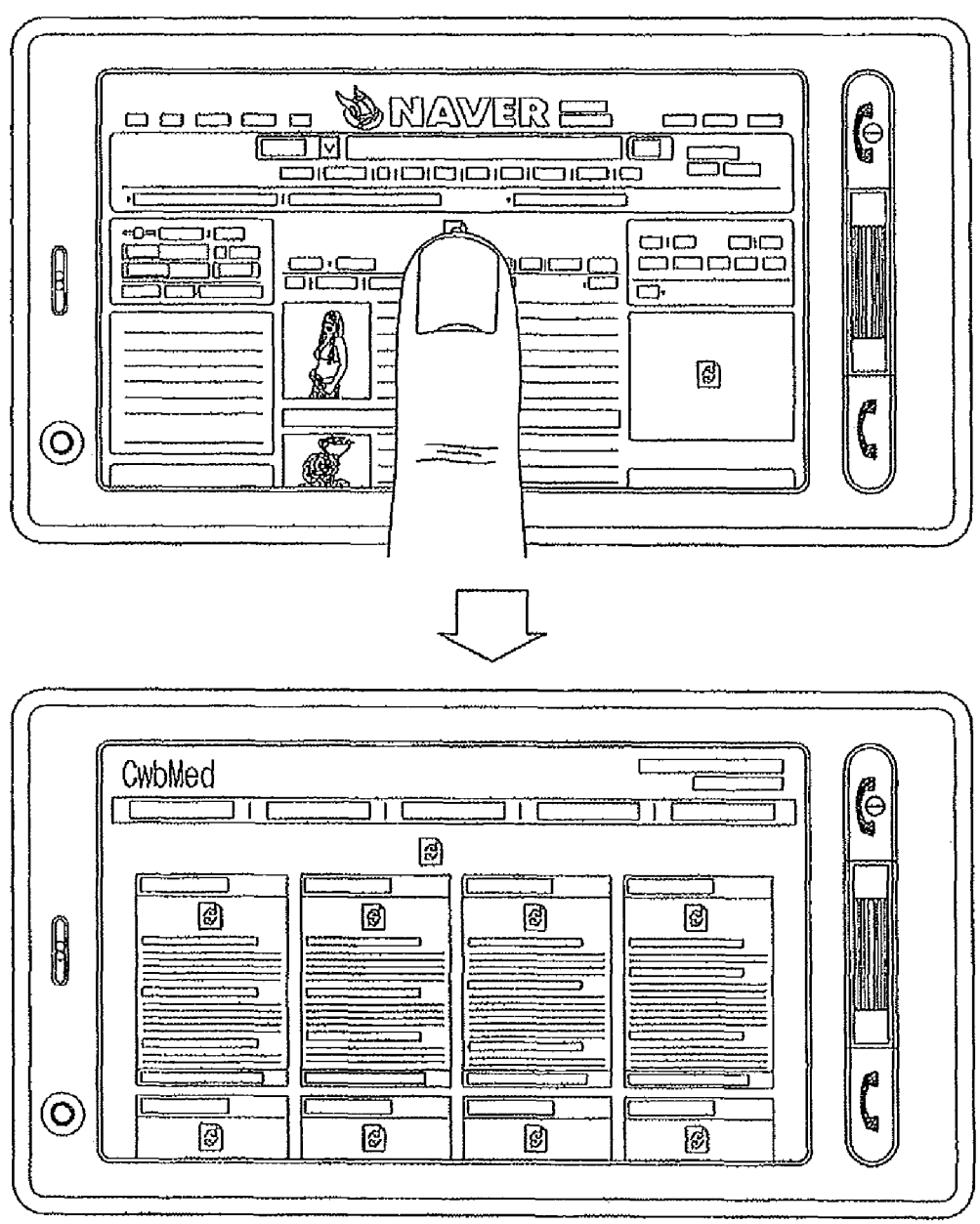
FIG. 12 is an overview of display screens illustrating the image display method of the mobile terminal according to another embodiment of the present invention.

FIG. 12 is an overview of display screens illustrating the image display method of the mobile terminal according to another embodiment of the present invention. In this embodiment, when a hid image on the Web page is touched (selected), the controller 180 checks an address of a Web page linked to the touched image and moves to the Web page corresponding to the address. Further, the controller 180 sets the image display mode of the linked Web page as an 'all image hiding' mode according to the touched image display mode. Namely, when moving to the linked page, the controller 180 controls images of the linked page according to a display mode of the linked image.

Further, when moving to the linked page, only the corresponding image, namely, only the selected image, having the same image identification information (e.g., an image file name) as that of the linked image, is set to be hid. The controller 180 can also display the text-based Web page, if the user's finger approaches the position where the image has existed, and output a vibration for the user's information. Also, the strength of the vibration may be adjusted to be stronger as the distance narrows between the user's finger and the position where the image has existed.

Figure 13:
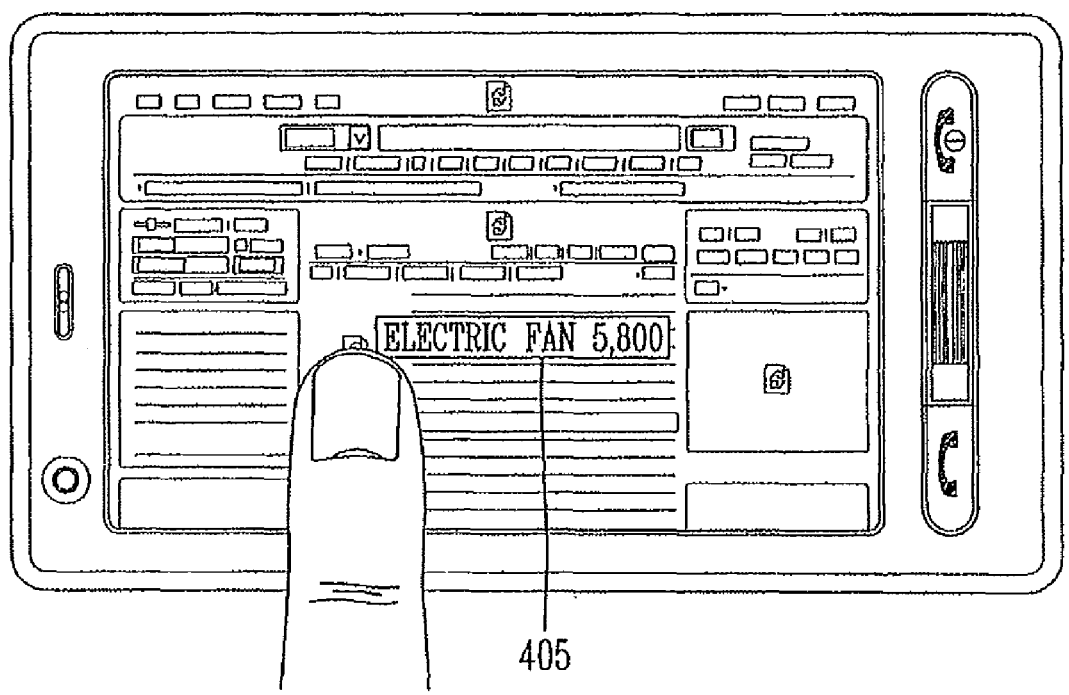
FIG. 13 is an overview of a display screen illustrating a method of displaying of alternate text when the mobile terminal detects a proximity touch according to an embodiment of the present invention.

Next, FIG. 13 is an overview of a display screen illustrating a method of displaying of alternate text when the controller 180 detects a proximity touch according to an embodiment of the present invention. As shown in FIG. 13, when the user moves their finger toward an image that is currently being hid, the controller 180 detects this event via the sensing unit 140. The controller 180 then display an alternate text 405 corresponding to the image hid (in this example, the alternate text reads "Electric fan 5,800"). Thus, the user can quickly see that the hid image is related to an electric fan.

Further, the controller 180 can display the text 405 in the form of a speech bubble, for example, as long as the user maintains the proximity touch. In addition, the alternate text may include information related to the image such as an explanation or a subject of the image, an image file name, or the like. Further, in this embodiment, the alternate text (explanation, subject, image file name, or the like) of the selected image is displayed. However, it is also possible to output a vibration or other haptic effect according to a type (e.g., a photo image, flash, video, or the like) of the selected image. For example, if the selected image is a photo image, the controller 180 can not output a vibration, and if the selected image is a flash, the controller 180 can output the vibration. It is also possible to display the selected image in a pop-up manner.

Figure 14A:
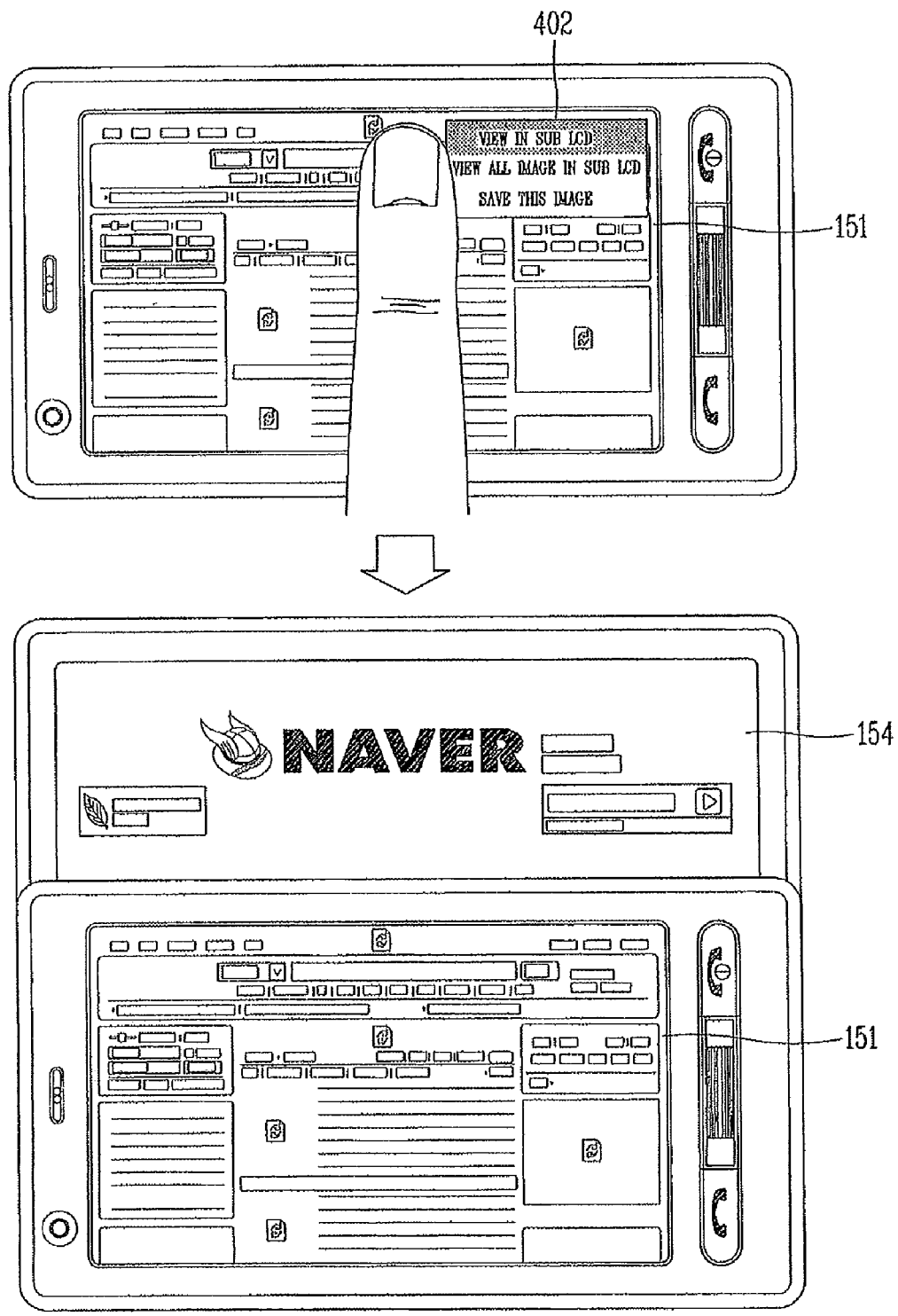
FIGS. 14A and 14B are overviews of display screens illustrating a method of controlling of an image in the mobile terminal according to another embodiment of the present invention.
Figure 14B:
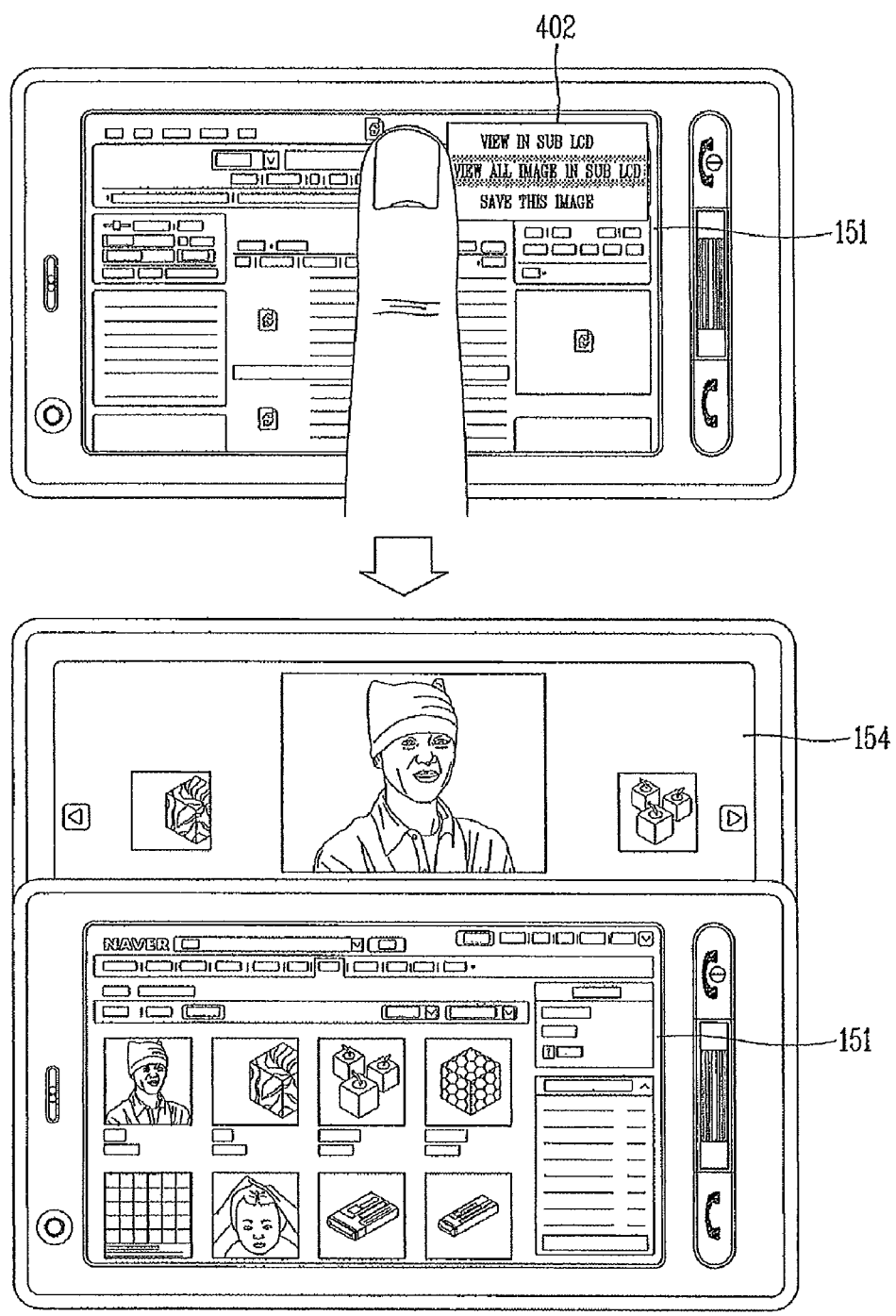

FIGS. 14A and 14B are overviews of display screens illustrating a method of controlling an image in the mobile terminal according to another embodiment of the present invention. In this embodiment, a mobile terminal having a dual display is taken as an example. As shown, when the user selects one image on a Web page displayed on the main display 151, the controller 180 displays a menu 402 for controlling a display mode of the image. As shown in FIG. 14A, when the user selects the option 'view in sub LCD' from the displayed menu 402, the controller 180 displays the selected image on the sub-display 154.

In addition, as shown in FIG. 14B, when the user selects the option 'view all images in sub LCD' from the displayed menu 402, the controller 180 sequentially displays all of the images included in the corresponding Web page on the sub-display 154. In this instance, the controller 180 may sequentially display the images based on image positions or frequency according to a user manipulation. Further, because the images included in the Web page are displayed via the sub-display, the user can additionally check desired information by using the sub-display without interfering with the information displayed on the main display.

Figure 15:
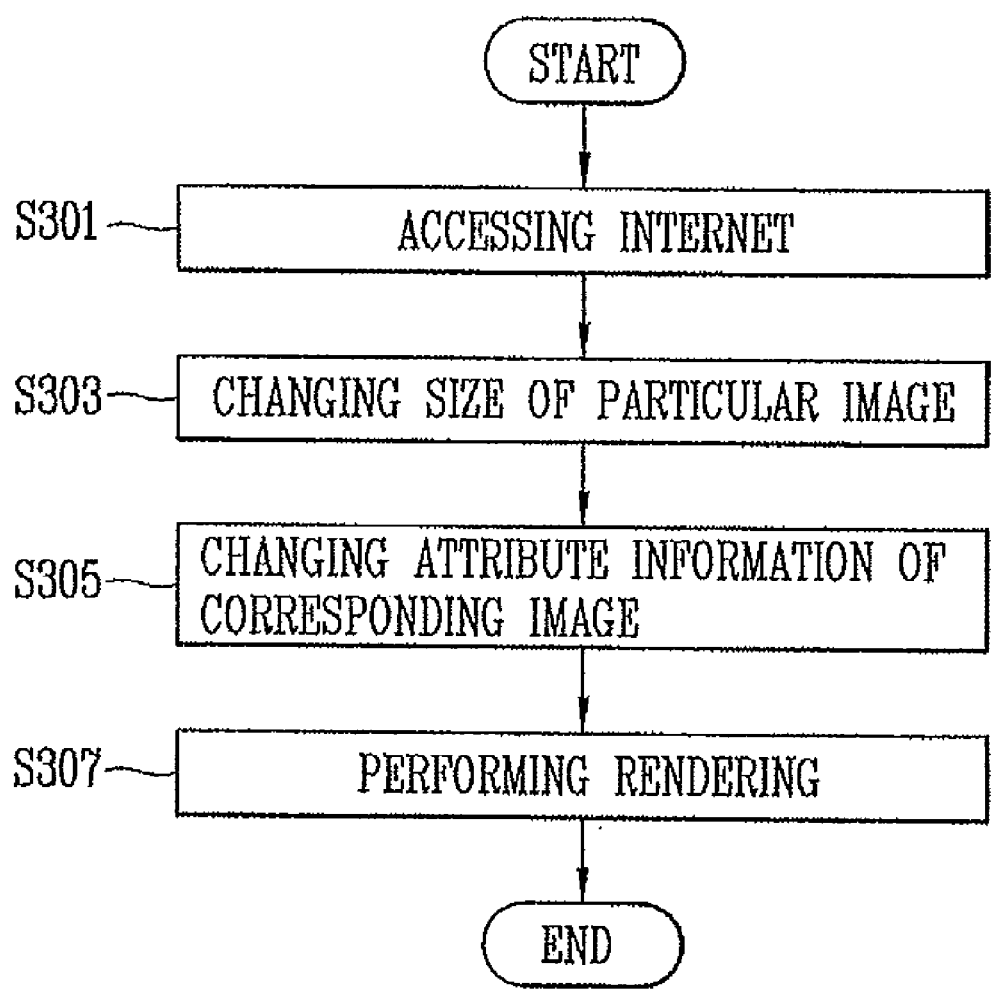
FIG. 15 is a flow chart illustrating an image control method of the mobile terminal according to another embodiment of the present invention.

Next, FIG. 15 is a flow chart illustrating an image control method of the mobile terminal according to another embodiment of the present invention. In this embodiment, a Web page is configured according to a change in an image size displayed on the mobile terminal. First, the controller 180 downloads a Web page via the wireless Internet module 113 and displays the Web page on the screen of the display module 151 (S301). In other words, the mobile terminal 100 is in a state of being connected to the Internet via the wireless Internet module 113.

When the size of a particular image displayed on the Web page is changed, the controller 180 changes attribute information of the corresponding image (S303 and S305). Namely, when the size of the image is changed, the controller 180 changes the size of the corresponding image in the DOM tree to re-configure the DOM. After the reconfiguration of the DOM, the controller 180 performs rendering based on the reconfigured DOM (S307). In other words, the controller 180 adjusts the configuration of the Web page according to the change in the image size.

FIGS. 16A and 16B are overviews of display screens illustrating a method of controlling of an image in the mobile terminal according to the embodiment of FIG. 15. With reference to FIGS. 16A and 16B, the user selects one image displayed on a Web page and drags a boundary of the selected image. Thus, the size of the corresponding image is adjusted according to the dragging distance (d). As shown in FIG. 16A, when the user performs the dragging operation inwardly based on the boundary of the image, the controller 180 reduces the size of the selected image by the distance (d) and moves objects near the boundary. Namely, when the boundary of the image is moved in an inward direction of the image, the objects positioned outside the moved boundary are moved in the same movement direction as much as the boundary has been moved.

With reference to FIG. 16B, if the user performs the dragging operation outwardly based on the boundary of the image, the controller 180 magnifies the size of the corresponding image by the drag distance (d). The controller 180 also moves the adjacent objects in the same direction as the drag direction as large as the corresponding image has been magnified. In other words, the objects positioned in the direction in which the boundary has been moved based on the boundary of the image before the size of the image is changed are moved by the movement distance of the boundary.

Further, when the magnification/reduction magnification of the image reaches a limit, the controller 180 may generate a vibration, an alarm sound, or the like, to inform the user. For example, if the size of the magnified image exceeds the size of a previously allocated image display region, the controller 180 may output a vibration, an alarm sound, or the like.

Also, a selected image is magnified/reduced through a dragging operation is taken as an example, but the size of the image may be magnified/reduced according to manipulation of the menu or the size of all the images of the Web page may be adjusted at one time. Further, hiding of images of the Web page are selectively set or released, but the hiding of images may be may be set or released collectively according to category information of the images. For example, only an image related to an advertisement or shopping may be set for hiding.

Further, the mobile terminal according to the embodiments of the present invention is not limited in its application of the configurations and methods, but the entirety or a portion of the embodiments can be selectively combined to be configured into various modifications.

In addition, the above various embodiments may be implemented in a computer-readable medium using, for example, computer software, hardware, or some combination thereof. For a hardware implementation, the embodiments described above may be implemented within one or more application specific integrated circuits (Asics), digital signal processors (Dips), digital signal processing devices (Spuds), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. A mobile terminal includes mobile phones, smart phones, notebook computers, digital broadcast receivers, PDAs (Personal Digital Assistants), PMPs (Portable Multimedia Players), navigation devices, etc.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
a wireless communication unit configured to connect to the Internet to receive a web page;
a display unit configured to display the web page;
a sensing unit configured to sense an orientation of the mobile terminal; and
a controller configured to:
present the web page according to the orientation of the mobile terminal;
change a size of an image on the web page presented on the display unit in response to a touch applied to effect a change in the size of the image;
reconfigure a boundary of the image displayed on the web page presented on the display unit according to the change in the size of the image; and
move objects positioned adjacent to the boundary of the image on the web page presented on the display unit toward the boundary of the image.

2. The mobile terminal of claim 1, wherein the controller is further configured to save the image.

3. The mobile terminal of claim 1, wherein the size of the image presented on the display unit is increased or decreased in response to the touch applied to change the size of the image.

4. The mobile terminal of claim 1, wherein the objects positioned adjacent to the boundary of the image comprise text regions on the web page.

5. The mobile terminal of claim 1,
wherein the controller is further configured to hide or show the image on the web page according to the orientation of the mobile terminal.

6. The mobile terminal of claim 1, wherein the controller is further configured to hide the image when the orientation of the mobile terminal is in a portrait orientation, and to show the image when the orientation of the mobile terminal is in a landscape orientation.

7. The mobile terminal of claim 6, wherein the controller is further configured to display the image hidden from the web page on a sub-display unit of the mobile terminal.

8. A method of controlling a mobile terminal, the method comprising:
connecting to the Internet to receive a web page;
displaying the web page on a display unit;
sensing an orientation of the mobile terminal;
presenting the web page according to the orientation of the mobile terminal;
changing a size of an image on the web page presented on the display unit in response to a touch applied to effect a change in the size of the image;

reconfiguring a boundary of the image displayed on the web page presented on the display unit according to the change in the size of the image; and moving objects positioned adjacent to the boundary of the image on the web page presented on the display unit toward the boundary of the image.

9. The method of claim 8, further comprising:
saving the image.

10. The method of claim 8, wherein the size of the image presented on the display unit is increased or decreased in response to the touch applied to change the size of the image.

11. The method of claim 8, wherein the objects positioned adjacent to the boundary of the image comprise text regions on the web page.

12. The method of claim 8,
wherein the image is hidden from or shown on the web page according to the orientation of the mobile terminal.

13. The method of claim 8, wherein the image is hidden from the web page when the orientation of the mobile terminal is in a portrait orientation, and is shown on the web page when the orientation of the mobile terminal is in a landscape orientation.

14. The method of claim 8, further comprising:
displaying the image hidden from the web page on a sub-display unit of the mobile terminal.

* * * * *